P. A. DOYLE.
MOTOR SLEIGH.
APPLICATION FILED APR. 23, 1921.
1,404,101. Patented Jan. 17, 1922.
2 SHEETS—SHEET 1.
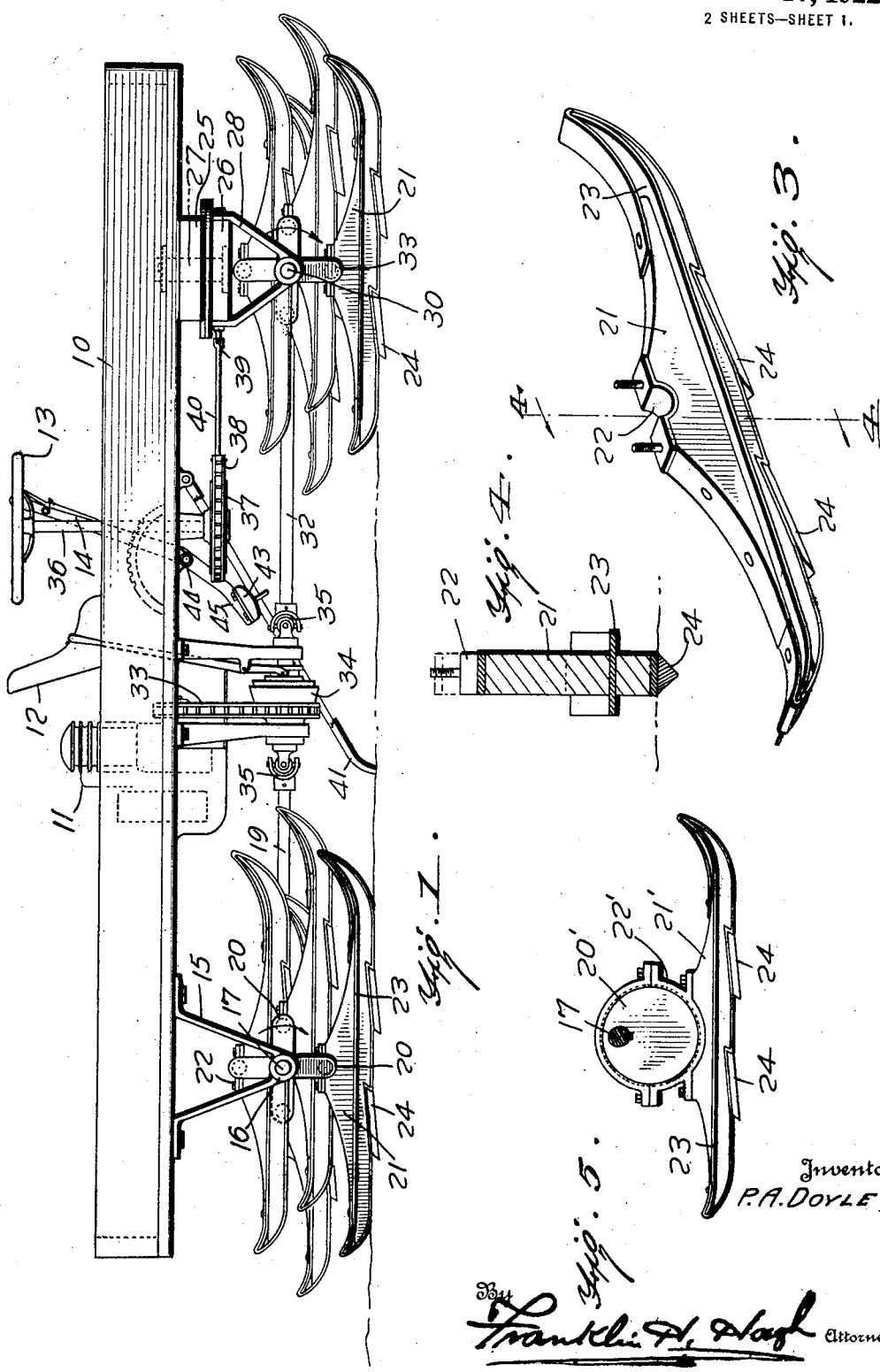

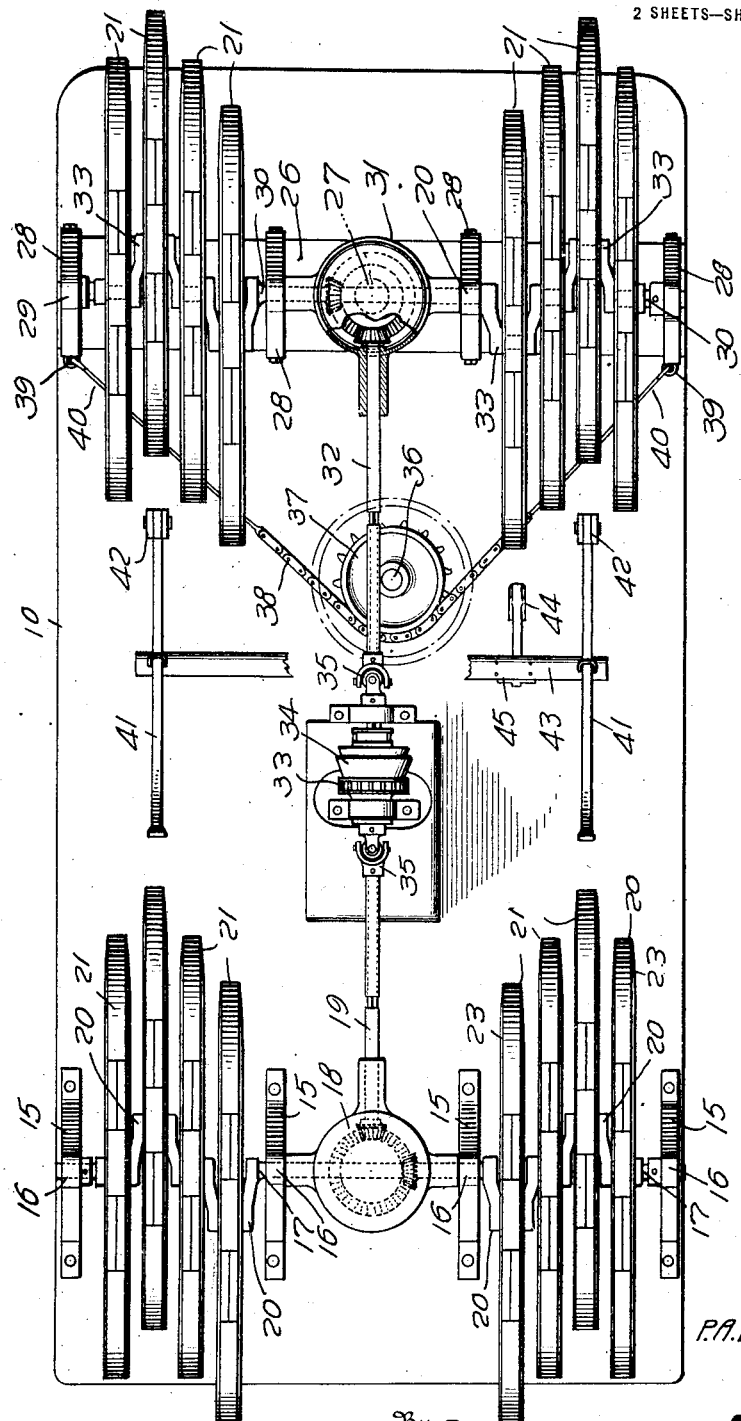

UNITED STATES PATENT OFFICE.

PATRICK A. DOYLE, OF COPENHAGEN, NEW YORK, ASSIGNOR OF ONE-FOURTH TO JAY SARGENT, OF COPENHAGEN, NEW YORK.

MOTOR SLEIGH.

1,404,101.           Specification of Letters Patent.      Patented Jan. 17, 1922.

Application filed April 23, 1921. Serial No. 463,951.

*To all whom it may concern:*

Be it known that I, PATRICK A. DOYLE, a citizen of the United States, residing at Copenhagen, in the county of Lewis and State of New York, have invented certain new and useful Improvements in Motor Sleighs, of which the following is a specification, reference being had therein to the accompanying drawings.

This invention relates to motor sleighs and has for an object to provide a sleigh wherein a plurality of runners are driven from the motor as steppers.

A further object of the invention is to provide improved means for actuating the runners, both front and rear, permitting for the proper steering of the device while the runners continue to operate.

A further object of the invention is to provide a motor sleigh having a plurality of runners upon each side, both front and rear, said runners operating as steppers driven by cranks, or other equivalent eccentrics, with improved means for engagement of the runners with the snow to restrain the movement of the runner backward upon the snow.

With these and other objects in view the invention comprises certain novel units, parts, combinations, mechanical movements and functions, as disclosed in the drawings and more particularly pointed out in the claims.

In the drawings:

Figure 1 is a view of the improved motor sleigh in side elevation, some parts being broken away for the sake of illustration;

Figure 2 is an inverted plan view, parts also being broken away;

Figure 3 is a perspective view of one of the runners;

Figure 4 is a transverse sectional view of one of the runners taken on line 4—4 of Figure 3, and Figure 5 is a view in side elevation of a runner showing the employment of an eccentric for driving, as distinguished from a crank arm shown in the other figures.

Like characters of reference indicate corresponding parts throughout the several views.

The motor sleigh disclosed in the present application is adapted to operate with any form of body and no attempt has been made to disclose a body which shall form any part of the invention. Such a body 10 is indicated merely as the platform upon which is supported a prime mover 11, a seat 12, a steering wheel 13 and a brake lever 14. It is to be understood, of course, that the arrangement of these several parts is wholly immaterial to the present invention and may be arranged in any approved manner, or as may be found desirable.

Beneath the body 10 brackets 15 are mounted having bearings at 16 for the rear axle shaft 17. The axle shaft 17 is driven from a gear casing 18 to which a power shaft 19 is conducted and may or may not be provided with differentials, as found desirable. The showing of a gear casing, as at 18, is no limitation in any manner upon the provision of differentials or other driving means within the casing, as may be necessary or expedient.

The shaft 17 is provided with a plurality of cranks 20. As shown at Figures 1 and 2 there are four of these cranks upon each side of the gear casing 18, but it is to be understood that the number is not essential and that any usual and ordinary or desired number may be employed. Each of the cranks 20 carries a runner 21 by means of a bearing 22, as indicated more particularly at Figures 1 and 4. Instead of forming the runners with the bearing 22 a ring 22' may enclose an eccentric 20' which is rigidly secured to the shaft 17, as shown more particularly at Figure 5.

In any event the runner is provided with a laterally extending flange 23 and beneath one or more detents 24. The arrangement and inclination of the detents 24, as will be noted more particularly from Figure 1, is such that they tend to engage the snow when the runnner attempts to move rearwardly, resisting such movement, whereby the sleigh as an organized structure is forced to move forward.

At the forward end the sleigh is provided with a bolster 25 and supporting plate 26 pivoted to the bolster of the king bolt indicated at 27.

Brackets 28 are provided similar to the brackets 15 similarly journaling at 29 the axle shaft 30 driven from the gear casing 31 by the power shaft 32. The axle shaft 30, as found at Figures 1 and 2, is provided with a plurality of cranks 33 similar to the cranks 20, and it is to be understood that the eccentric 20' may be substituted therefor in like manner.

The runners are substantially identical with the runners 21 and are preferably interchangeable. The prime mover 11 is connected with the power shafts 19 and 32 in any approved manner, as by the sprocket chain 33, clutch 34 and universal joint 35, providing for flexibility in steering.

The steering is accomplished by means of a steering wheel 13 connected with the steering column 36 having a sprocket 37 carrying a sprocket chain 38. The sprocket chain 38 may continue to the brackets 28 and engage eyes 39, or may employ rods 40 to extend from the ends of the sprocket chain to the eyes 39. In any event the rotation of the sprocket wheel 37 and the steering column 36 will operate the sprocket chain 38, swinging the plate 26 upon the king bolt 27 and carrying therewith the shaft 30 and the several runners 21 carried thereby, permitting thereby the steering of the device by the dirigibility of the forward battery of runners and driving mechanism.

A brake, preferably in the form of two brake bars 41, is pivoted beneath the body at 42 and connected by a cross bar 43. The brake lever 14, heretofore referred to, pivoted beneath the body at 44, is rigidly connected with the cross bar 43 at 45. By manipulation of the lever 14 the brake bars 41 may be made to engage the surface of the ground, or snow, as indicated at Figure 1, whereby movement of the sleigh in either direction is retarded.

What I claim to be new is:

1. In a motor sleigh, a plurality of runners, a shaft and means for driving the same, the shaft being provided with a plurality of cranks, the cranks mounted to the runners midway of the length of the runners, the cranks being disposed at quadrants relative to each other at each end of the shaft.

2. A motor sleigh comprising groups of runners at the front and rear arranged to operate in timed relation as steppers, and means to steer the forward group of runners.

3. A motor sleigh comprising a plurality of groups of runners, both front and rear, arranged to operate in timed relation as steppers, means carried by each of said runners resisting sliding movement in one direction, while permitting sliding in the opposite direction, and means to move the forward groups of runners as an organized structure to provide for steering.

4. A motor sleigh comprising rear runners, forward runners arranged in groups adapted to operate as steppers, and means to steer the forward groups of runners as an organized structure for steering the sleigh.

5. A motor sleigh comprising a group of runners arranged substantially in parallelism, a power driven shaft provided with a plurality of cranks equal in number to the runners, means connecting one of the cranks with the middle of each of the runners, and means facilitating the manual actuation of the group of runners for steering purposes.

In testimony whereof I hereunto affix my signature in presence of two witnesses.

PATRICK A. DOYLE.

Witnesses:
WM. HENRY,
JOHN WOOLSELGER.